F. BRIGGS.
STEERING MECHANISM FOR BEET HARVESTERS.
APPLICATION FILED NOV. 4, 1910.

1,002,895.

Patented Sept. 12, 1911.
2 SHEETS—SHEET 1.

Witnesses
C. M. Shannon
S. E. McIram

Inventor
FRANK BRIGGS
By
Attorneys

F. BRIGGS.
STEERING MECHANISM FOR BEET HARVESTERS.
APPLICATION FILED NOV. 4, 1910.
1,002,895.
Patented Sept. 12, 1911
2 SHEETS—SHEET 2.
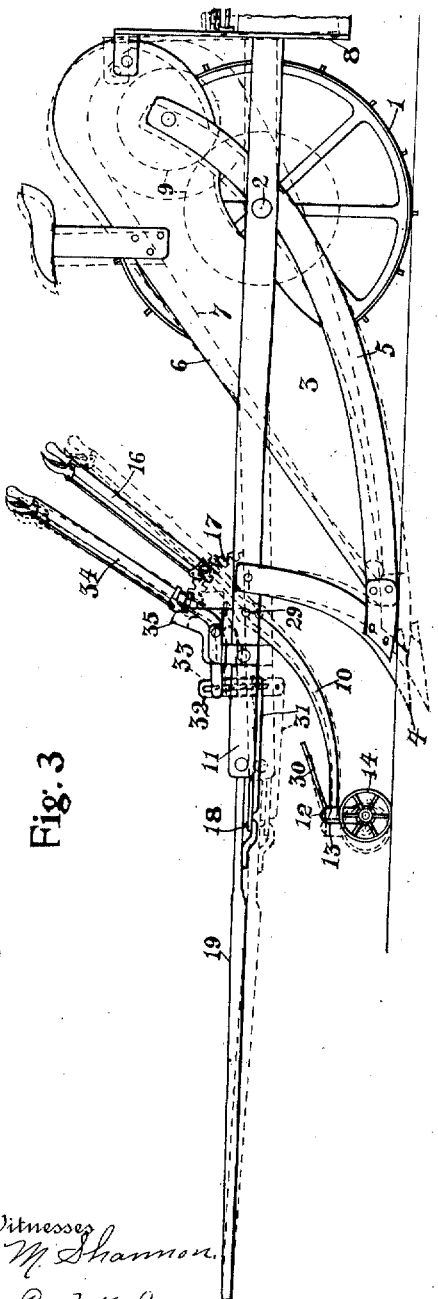
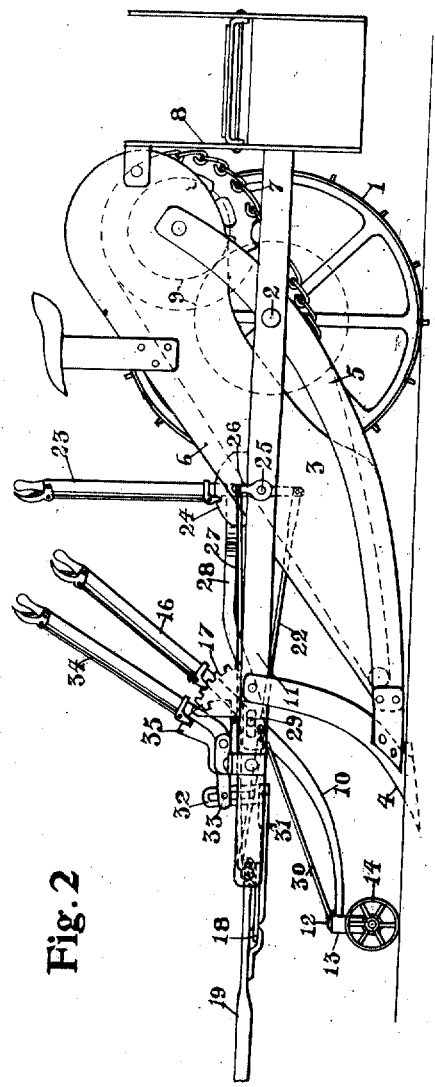
Inventor
FRANK BRIGGS
Attorneys

UNITED STATES PATENT OFFICE.

FRANK BRIGGS, OF LEAVENWORTH, WASHINGTON.

STEERING MECHANISM FOR BEET-HARVESTERS.

1,002,895.

Specification of Letters Patent. Patented Sept. 12, 1911.

Application filed November 4, 1910. Serial No. 590,755.

*To all whom it may concern:*

Be it known that I, FRANK BRIGGS, a citizen of the United States of America, residing at Leavenworth, in the county of Okanogan and State of Washington, have invented certain new and useful Improvements in Steering Mechanism for Beet-Harvesters, of which the following is a specification, reference being had therein to the accompanying drawings.

In the operation of root harvesting machines and more particularly those adapted for lifting beets and the like, it is necessary that the plows, lifting members, or the like be made to follow accurately the beet row or other line that the machine is operating on in order to avoid breaking of the beets and vegetables. The irregularities of the ground over which the machine is drawn, and in the row itself as well as the side motion of the team, must be overcome to prevent damage to the crop.

This invention relates to root harvesters and to means for guiding the machine from the operator's station to hold the lifters or pullers in proper operative relation to the row of beets or the like that is being harvested.

The invention consists in the matters hereinafter set forth, and more particularly pointed out in the appended claims.

Figure 1:
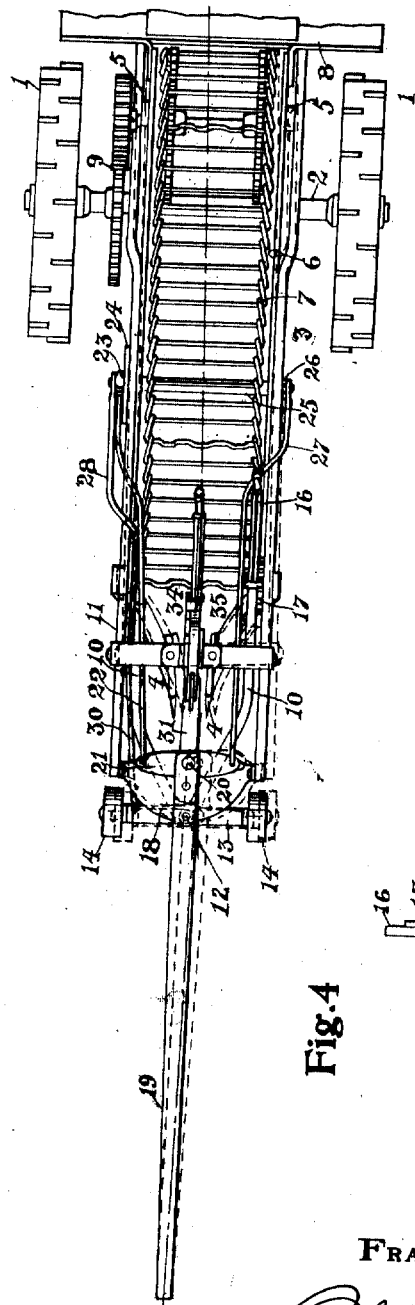
Figure 4:
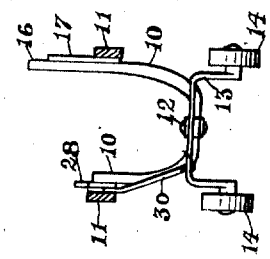

In the drawings, Figure 1 is a plan view of a machine embodying features of the invention; Fig. 2 is a view in side elevation partly broken away; Fig. 3 is a view in side elevation of the machine with steering gear omitted, showing different position of the pullers in relation to the surface of the ground; and Fig. 4 is a view in detail of forward gage wheels and their connections.

As herein illustrated the machine is shown especially adapted for lifting sugar beets. A pair of traction bearing wheels 1 with main drive shaft 2 supports the rear end of a main frame 3. A pair of beet lifters 4 of any preferred type are secured beneath the forward portion of the frame and have rearwardly extending braces 5. A conveyer chute 6 with an endless conveyer 7 carries the beets to the rear of the traction wheels into a side delivery trough 8. A gear train indicated at 9, or other suitable means operate the conveyer from the traction wheels.

A pair of convergent depending braces 10 are pivoted at their upper ends to the side members 11 of the main frame near the forward end thereof. Their united forward ends are pivoted by a stud 12 to the center of a yoke 13 which is carried by a pair of gage wheels 14 which travel on the ground in advance of the lifters 4. One of the rods 10 is extended upward and forms a hand lever 16 interlocking with a quadrant 17 whereby the main frame may be raised or lowered as desired.

A segmental draft plate 18 is pivoted at its ends to the forward extremities of the side members 11 of the main frame. A draft pole 19 is pivotally secured as by a pin 20 at its rear end to swing in a horizontal plane on the draft plate 18. A cross arm 21 is rigidly connected to the rear end of the pole. A link 22 couples one end of the cross arm with the lower end of a steering lever 23 interlocking with a quadrant frame 24. A rock shaft 25 in the main frame that is operated by the lever 23 has an arm 26 opposite the lever which is coupled by a link 27 to the other end of the cross arm 21 so that oscillation of the lever swings the pole from side to side of the frame. A push bar 28 is connected at one end to the lever 23 and has a longitudinal slot at its forward end engaged by a stud 29 on the main frame. A rod 30 connects one end of the yoke 13 with the push bar 28. The connections between the steering lever 23, the yoke 13 and the cross arm 21 are so proportioned and adjusted that a movement of the steering lever 23 swings the pole in one direction and the forward gage wheels 14 in the opposite direction.

To support the pole 19 and permit it to have limited range of vertical movement regardless of elevation or depression of the main frame, a rearwardly extending stem 31 on the segmental plate 18 has a longitudinally slotted upright arm 32 engaged by a stud 33 on the end of a hand lever 34 playing in a quadrant 35 on the main frame.

In operation, when the machine is drawn astride of a row of beets the team holds the forward end of the pole against lateral movement. To follow the irregularities in the row the operator moves the steering lever so as to swing the gage wheels at the proper angle to guide the lifters along the row. This movement throws the inner end of the pole with the forward portion of the frame toward the side to which the gage wheels tend to move the frame, as indicated in the dotted diagram shown in Fig. 1. In other words the traction wheels and forward end of the pole are fixed points and the tongue and frame are hinged between them and made to break in either way as required, the canting of the gage wheels assisting this movement. By this means the harvester can be kept accurately in operative relation to a row of beets or the like so that the latter can be lifted without being broken regardless of any irregularities in the row or in the surface of the ground.

Obviously, changes in the details of construction may be made without departing from the spirit of the invention and I do not wish to limit myself to any particular form or arrangement of parts.

I claim as my invention:—

1. In a root harvester, a main frame, main bearing wheels supporting the rear end thereof, gage wheels supporting the forward end thereof, a draft pole pivoted to the forward end of the machine to swing in a horizontal plane, manually operable means for simultaneously swinging the pole and gage wheels in opposite directions, and root lifters on the main frame between the main and gage wheels.

2. In a root harvester, a main frame, main bearing wheels supporting the rear end thereof, gage wheels supporting the forward end thereof angularly adjustable in a horizontal plane, a draft pole pivoted to the forward end of the frame to swing in a horizontal plane, manually operable means for simultaneously swinging the pole and gage wheels in opposite directions, means for raising and lowering the frame on the gage wheels, and root lifters on the main frame between the main and gage wheels.

3. In a root harvester, a main frame, main bearing wheels supporting the rear end thereof, vertically adjustable gage wheels supporting the forward end thereof, a draft pole pivoted to the forward end of the machine to swing laterally therein, means for raising and lowering the gage wheels in relation to the frame, manually operable means for simultaneously swinging the pole and gage wheels laterally in opposite directions, and root lifters secured to the main frame between the main and gage wheels.

4. In a root harvester, a main frame, main bearing wheels supporting the rear end thereof, a yoke pivotally supporting the forward end of the frame, gage wheels journaled on the yoke, a draft pole pivoted to the forward end of the machine to swing laterally, a steering lever operatively connected to the yoke and to the pole to swing them in opposite directions when moved and root lifters on the main frame between the main and gage wheels.

5. In a root harvester, a main frame, main bearing wheels supporting the rear end thereof, a yoke pivotally supporting the forward end of the frame, gage wheels journaled on the yoke, a segment plate vertically tiltable on the forward end of the main frame, a draft pole pivoted to the segment plate to swing laterally, a steering lever on the main frame operatively connected to the yoke and to the pole to swing them in opposite directions when moved, and root lifters on the main frame between the main and gage wheels.

6. In a root harvester, a main frame, main bearing wheels supporting the rear end thereof, gage wheels supporting the forward end thereof, a pole pivotally connected to the forward end of the frame to swing laterally and to tilt vertically, adjustable means for limiting the range of the vertical movement of the pole, manually operable means on the main frame adapted to simultaneously swing the pole and gage wheels laterally in opposite directions, and root lifters on the main frame between the main and gage wheels.

7. In a root harvester, a main frame, main bearing wheels supporting the rear end thereof, a gage wheel yoke on the forward end of the main frame, means for swinging the yoke toward the frame, gage wheels supporting the yoke, a vertically and laterally adjustable draft pole on the forward end of the main frame, steering means on the main frame operatively connected to the yoke and pole to swing them laterally in opposite directions, and root lifters on the main frame behind the yoke.

8. In a root harvester, a main frame, main bearing wheels supporting the rear end thereof, a pair of braces pivoted to the forward end of the frame to swing in a vertical plane, a hand lever on the frame for moving the braces, a yoke pivoted to the dependent connected ends of the braces to swing laterally, gage wheels journaled on the yoke, a draft pole pivoted to the forward end of the frame to swing laterally and steering means on the main frame operatively connected to the pole and yoke and adapted to swing them in opposite directions when moved.

9. In a root harvester, a main frame, main bearing wheels supporting the rear end thereof, gage wheels supporting the forward end thereof, a segment plate pivoted to the forward end of the main frame on an axis transverse to the frame, a draft pole pivoted to the plate to swing laterally in the plane thereof, adjustable means on the frame for limiting the range of motion of the plate, steering means on the frame connected to the pole and gage wheels and adapted to swing them laterally in opposite directions when moved and root lifters on the main frame behind the gage wheels.

10. In a root harvester, a main frame, main bearing wheels supporting the rear end thereof, gage wheels supporting the forward end thereof, a pole pivotally connected to the forward end of the frame to swing laterally, a cross arm on the rear end of the pole, a transverse rock shaft on the main frame, a steering lever secured at one end of the shaft, a rock arm extending from the shaft opposite to the lever, a link connecting one end of the cross arm and the lever, a link articulating the other end of the cross arm and the rock arm, means connecting the gage wheels and lever to swing the wheels in opposite direction to the pole when the lever is moved, and root lifters on the main frame behind the gage wheels.

11. In a root harvester, a main frame, main bearing wheels supporting the rear end thereof, a segment plate pivoted to the forward end thereof on an axis transverse to the frame, an upright slotted member on the plate, an angularly adjustable lever on the frame engaging the slotted member, a draft pole pivoted at its rear end to the segment plate to swing laterally in the plane thereof, a cross arm on the rear end of the pole, a transverse rock shaft on the main frame, a lever secured to the rock shaft, a rock arm secured to the rock shaft oppositely to the lever, a link coupling the lever with one end of the cross bar, a link articulating the rock arm with the other end of the cross bar, means on the frame for locking the shaft lever in an adjusted position, a pair of braces pivoted near their upper ends to the main frame, a yoke pivoted to the connected lower ends of the braces to swing laterally, a pair of gage wheels supporting the yoke, means connecting the yoke and rock shaft lever to swing the yoke oppositely to the pole when the lever is moved, a lever for swinging the braces on the frame, means on the frame for locking the brace lever in adjusted position, and root lifters on the main frame behind the gage wheels.

In testimony whereof I affix my signature in presence of two witnesses.

FRANK BRIGGS.

Witnesses:
 E. W. Evans,
 G. E. Evans.